(12) United States Patent
Jackson et al.

(10) Patent No.: US 6,629,712 B2
(45) Date of Patent: Oct. 7, 2003

(54) EXTENDABLE LATCH

(75) Inventors: Frank Thomas Jackson, Lake Elsinore, CA (US); Lionel Martinez, Whittier, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 09/822,705

(22) Filed: Mar. 30, 2001

(65) Prior Publication Data

US 2002/0140238 A1 Oct. 3, 2002

(51) Int. Cl.[7] .............................................. E05C 17/32
(52) U.S. Cl. .................. 292/263; 244/129.4; 244/53 B; 292/278
(58) Field of Search ........................... 292/262, 256.69, 292/263, 278, 275, 274, DIG. 49.7; 16/368; 244/129.4, 129.5, 53 B

(56) References Cited

U.S. PATENT DOCUMENTS

| | | | | |
|---|---|---|---|---|
| 4,278,280 A | * | 7/1981 | Rashbaum ................... 292/263 |
| 4,549,708 A | | 10/1985 | Norris ...................... 244/129.4 |
| 4,679,750 A | | 7/1987 | Burhans ................... 244/129.4 |
| 4,828,299 A | * | 5/1989 | Poe ............................ 292/139 |
| 4,890,703 A | | 1/1990 | Hathaway ................... 188/300 |
| 4,925,230 A | | 5/1990 | Shelton ........................ 296/76 |
| 5,046,689 A | * | 9/1991 | Shine ....................... 244/129.4 |
| 5,076,514 A | | 12/1991 | Melcher ................... 244/129.4 |
| 5,217,267 A | | 6/1993 | Yagi ............................ 292/338 |
| 5,579,875 A | | 12/1996 | Vargas et al. ................ 188/300 |
| 5,636,814 A | * | 6/1997 | Rollert .......................... 192/71 |
| 5,984,382 A | * | 11/1999 | Bourne et al. .............. 292/113 |
| 6,036,238 A | * | 3/2000 | Lallament ................ 244/129.4 |
| 6,189,832 B1 | | 2/2001 | Jackson ................... 244/129.4 |
| 6,325,428 B1 | * | 12/2001 | Do .......................... 244/129.4 |
| 6,386,598 B1 | * | 5/2002 | Dykstra et al. ............. 220/315 |

* cited by examiner

Primary Examiner—J. J. Swann
Assistant Examiner—Dinesh Melwani
(74) Attorney, Agent, or Firm—Barnes & Thornburg

(57) ABSTRACT

An extended latch mounted to a structure for securing an adjacent structure. The extended latch is a remotely-actuated latch mechanism that allows the adjacent structure to be released and moved apart from the structure, and later rejoined with the structure without disengagement of the latch mechanism from either structure.

The extended latch includes a housing that has a first wall and a second wall that are aligned with and positioned parallel to each other. An extendable linkage is rotatably mounted to the housing. The extendable latch also includes a strut having a central axis and opposing ends. One end of the strut is rotatably mounted to the extendable linkage. The other end of the strut is rotatably mounted to a keeper bar. The extendable latch also includes a detent mechanism rotatably mounted to both the housing and the extendable linkage. The detent mechanism has a blocking position in which the detent mechanism is adjacent to the strut, and an unblocking position in which the detent mechanism is away from the strut.

16 Claims, 14 Drawing Sheets

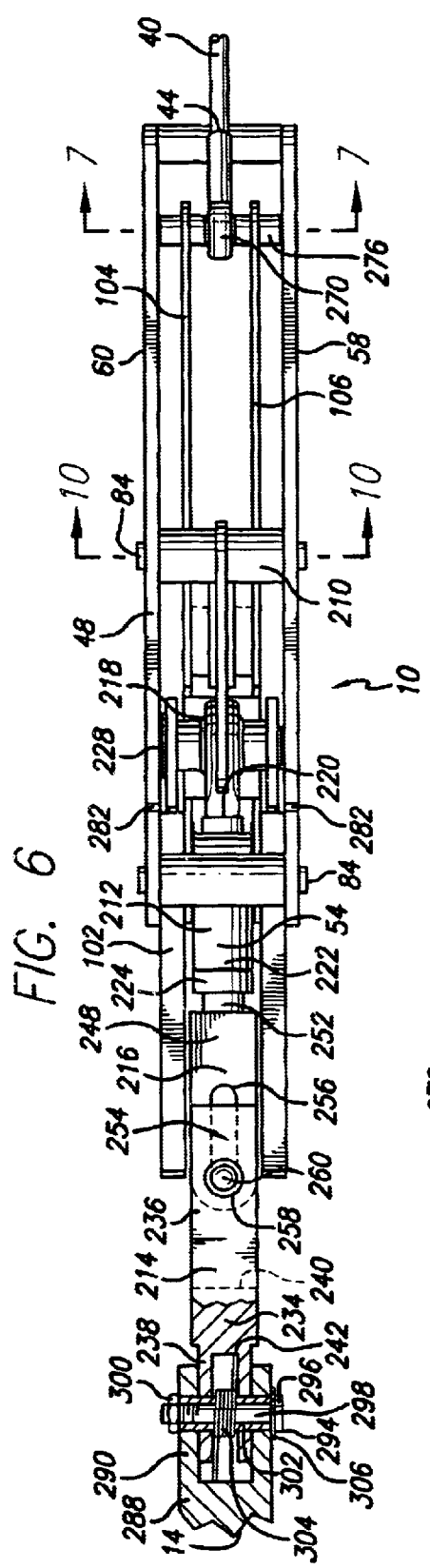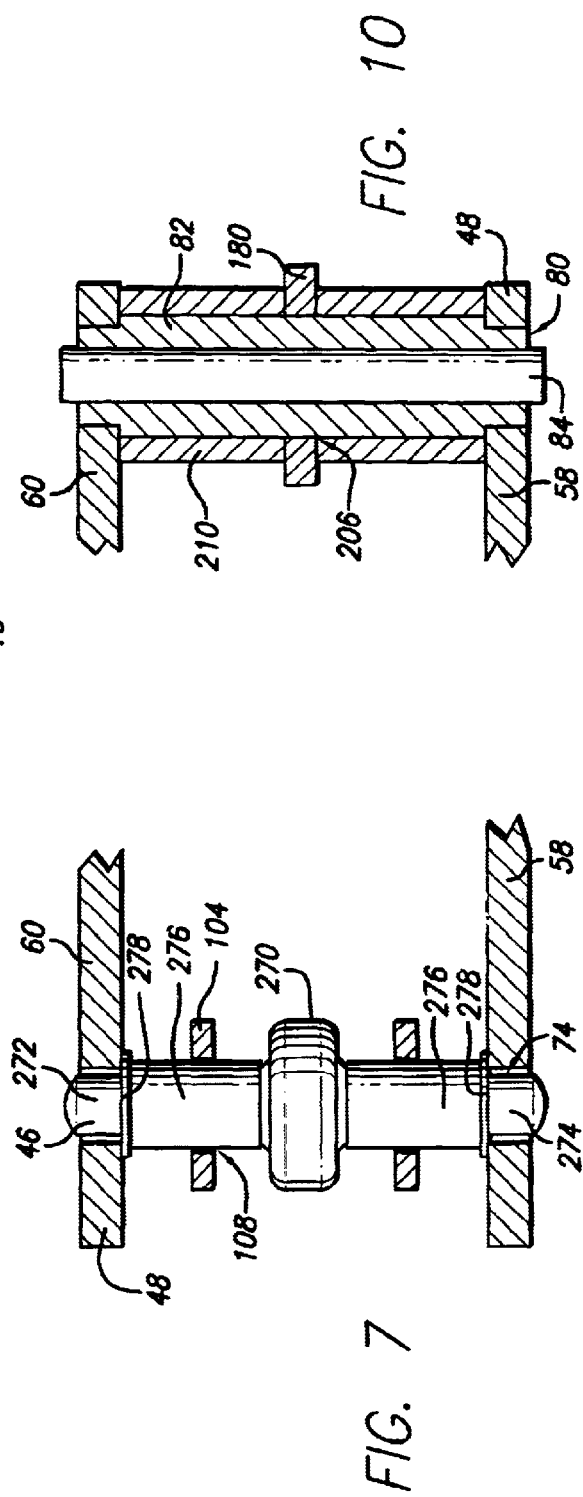

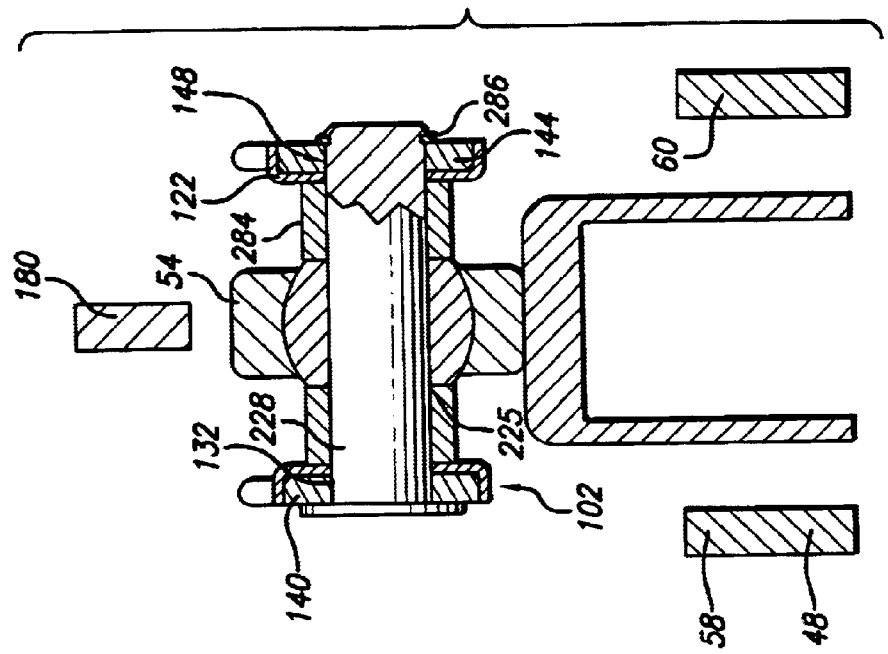
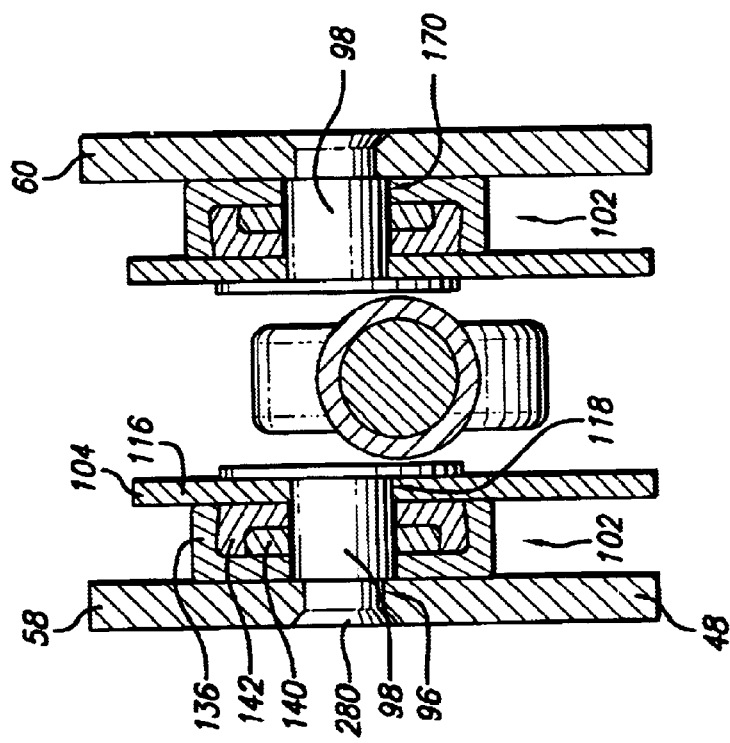

EXTENDABLE LATCH

FIELD OF THE INVENTION

The present invention relates generally to the field of latch mechanisms and, more particularly, to an extendable latch which secures an aircraft cowling to an engine pylon.

BACKGROUND OF TEE INVENTION

Modern jet engines are mounted to an aircraft with pylons or a similar support structure. A nacelle, in turn, is supported by both the engine and by the engine pylon. The nacelle is aerodynamically contoured to reduce aerodynamic drag during operation of the aircraft. The nacelle includes a pair of thrust reverser cowlings which form a large conical-shaped structure that wraps around the aircraft engine. These thrust reverser cowlings define an outer wall of the engine exhaust nozzle and must be capable of withstanding considerable hoop tension loads caused by the high pressure of the jet exhaust stream flowing therein.

The thrust reverser cowlings are normally connected by hinges to the engine pylon. The thrust reverser cowlings are hinged so that they can be pivoted upward to provide access to the engine for maintenance and repair. During aircraft operation, the thrust reverser cowlings must be pivoted downward, into closed positions, in which their ends are adjacent to one another or adjacent to an interposed strut.

The thrust reverser cowlings are attached at the top of each thrust reverser cowling, near the hinge line, to the engine pylon by remotely-actuated tension latches. Various types of tension latches mount and lock thrust reverser cowlings, to an engine pylon. A typical top-mounted latch includes a hook connected to the thrust reverser cowling used to engage a keeper mounted to the engine pylon. Further, the latch includes a remote handle which actuates the hook through a linkage. The latch incorporates an over-center position to establish rigid retention of the thrust reverser cowling to the engine pylon in the closed position.

A disadvantage of prior latches is that when the latches are closed, the linkages may or may not have been moved sufficiently such that it resumes the properly closed and over-center position. A further disadvantage of prior latches is that they need to be specifically designed for each model of aircraft. The latch for a particular aircraft model is designed to accommodate the distance between the thrust reverser cowling and the engine pylon required to allow the thrust reverser cowling to pivot between open and closed positions. For example, certain models of aircraft have the hinge points for the thrust reverser cowling close to where the latch will be attached to the engine pylon, thus, requiring the latch to accommodate a small distance. Conversely, other models of aircraft have the hinge points for the thrust reverser cowling distant from where the latch will be attached to the engine pylon requiring the latch to accommodate a long distance. Thus, each latch must be specifically designed for each model of aircraft. Unfortunately, this results in large amounts of resources being expended on research, design, and development to create particularized latches to be used with specific models of aircraft.

Prior latches have presented many problems when thrust reverser cowlings are closed. Top-mounted latches are not visible from the ground and must use remotely-actuated latch mechanisms which engage a keeper with a hook or opposing jaws. The hook or opposing jaws are connected to, and actuated by, a cable which in turn is connected to a handle located near the ground. This configuration allows a mechanic to open and close the latch from the ground at the bottom of the thrust reverser cowlings. When the latch is opened, the hook or opposing jaws disengage from the keeper allowing the thrust reverser cowling to be opened. After closing the thrust reverser cowling, the latch can be closed by use of the handle.

A disadvantage of these remotely-actuated latch mechanisms is that if the hook, opposing jaws, or keeper are not in the proper position, or are broken, it may still be possible to close the latch without engaging the keeper. Thus, resulting in a false indication that the latch is closed. A further disadvantage of the use of these remotely-actuated latch mechanisms is that there is no way for the mechanic to visually verify whether or not the hook or opposing jaws have properly engaged the keeper from the ground. Therefore, the mechanic operating the remotely-actuated latch mechanism can never be sure that the latch is properly closed.

Various devices, in conjunction with the previously described remotely-actuated latch mechanisms, have been used, unsuccessfully, to verify that the latch is properly closed. For example, previous attempts have been made to attach special devices such as sensors, feelers, or additional mechanisms to these latches to alert the mechanic when the hook or opposing jaws are not properly engaged to the keeper. The disadvantage of using these devices is that they are also subject to failure, damage, or human error.

In view of the above, it should be appreciated that there is a need for a latch that provides the advantages of having a linkage that; is secure in the closed and over-center position, ensures the linkage resumes the closed and over-center position when the latch is properly closed, designed to accommodate different distance requirements for the thrust reverser cowling to pivot between open and closed positions, and most importantly, is permanently connected to a keeper on the engine pylon. Therefore, eliminating the need for special devices used to verify that the latch is properly closed. The present invention satisfies these and other needs and provides further related advantages.

SUMMARY OF THE INVENTION

The present invention resides in an extendable latch. The extendable latch provides advantages over known latches in that it provides a linkage which is secure in the closed and over-center position, ensures that the linkage resumes the closed and over-center position when the extendable latch is properly closed, is designed to accommodate different distance requirements for the thrust reverser cowling to pivot between open and closed positions, and is permanently connected to a keeper on the engine pylon. Thus eliminating the need for special devices used to verify that the latch is properly closed. Furthermore, the extendable latch, in combination with other features described below, possesses a unique relationship of slots, links, and a spring that enables the latch to open and close without the problems inherent in the disengagement and re-engagement of the latch from the keeper.

The extendable latch is used for securing a thrust reverser cowling to an engine pylon. The extendable latch is connected to one end of a push/pull cable. The other end of the push/pull cable is connected to a handle which also has an open and a closed position. Preferred embodiments of the extendable latch include a housing, an extendable linkage, a keeper bar, a strut, and a detent mechanism. The housing includes a first wall and a second wall that are aligned with and positioned parallel to each other. The extendable linkage is rotatably mounted to the housing. The strut has a central axis and opposing ends with one end of the strut rotatably mounted to the extendable linkage, and the other end of the strut rotatably mounted to the keeper bar. Also, the detent mechanism is rotatably mounted to both the housing and the extendable linkage. The detent mechanism has a blocking position in which the detent mechanism is adjacent the strut. The detent mechanism also has an unblocking position in which the detent mechanism is away from the strut.

In another alternative embodiment of the invention, at least one step rivet, having a center region, rotatably mounts the extendable linkage to the housing. Also, the end of the strut that mounts to the extendable linkage includes a collar. A pin inserts through the collar rotatably mounting the strut to the extendable linkage. Also, a mounting keeper rotatably mounts the strut to the keeper bar. In addition, this embodiment has an over-center position where the collar is located between the first and second walls and the central axis of the strut is located below the center region of the step rivet. The over-center position is such that it prevents the strut from inadvertently moving.

In this embodiment of the invention, the detent mechanism includes a blocking link and a connecting link, both with opposing ends. One end of the blocking link is rotatably mounted to the housing. The other end of the blocking link is adjacent the strut when the detent mechanism is in the blocking position. Also, one end of the connecting link is rotatably mounted to the extendable linkage. The other end of the connecting link is rotatably mounted to the blocking link.

An additional embodiment of the invention includes an extendable linkage having a plurality of adjacent links which telescope in and out of one another. Additionally, each of the plurality of adjacent links has at least one stepped protrusion. The stepped protrusion of each link mates with the stepped protrusion of another adjacent link such that each link is connected to an adjacent link.

In yet another embodiment of the invention, the extendable linkage includes a base link and a plurality of other links. The base link and the plurality of other links telescope in and out of one another. The step rivet mounts through a base link slot in each base link. Also, the base link and each of the plurality of other links has at least one stepped protrusion. Each stepped protrusion of each link mates with the stepped protrusion of each adjacent link such that each link is connected to its respective adjacent link.

An advantage of the present invention is that the detent mechanism overcomes the difficulties associated with prior latches which are prone to be moved from their respective closed and over-center positions due to forces encountered during flight. The action of the detent mechanism secures the strut such that the present invention is less likely to open. Therefore, the extendable latch is inherently stable and is not prone to inadvertently open.

A related advantage of the detent mechanism is that it ensures that the strut resumes the over-center position when the extendable latch is closed. As the extendable latch is closed, the blocking link of the detent mechanism engages the strut and pushes the strut back into the over-center position. Therefore, when an operator closes the extendable latch, the operator can be assured that the strut has resumed the over-center position and that the thrust reverser cowling is rigidly latched to the engine pylon.

A feature of the present invention is that it includes an extendable linkage with a plurality of links which telescope in and out of each other, thus, accommodating different distance requirements. Also, by simply adjusting the number and/or the length of the plurality of links used in the extendable linkage, the extendable latch can be used with even a greater variety of aircraft whose distance requirements may not initially fit within the reach of the extendable latch.

An additional advantage of the present invention is the unique relationship of slots, links, and a spring that allow the strut and the mounting keeper to remain securely engaged, i.e., permanently connected, thus, ensuring that; the mounting keeper is always properly engaged to the strut, the latch will always close properly, and a potentially unsafe condition will not occur. This is important because the extendable latch is mounted at the top of the thrust reverser cowling, near the hinge line, where an operator of the extendable latch cannot visually verify whether or not the extendable latch has properly closed.

A further advantage of the present invention is that no special devices need be used to alert an operator that the extendable latch is not properly engaged to the mounting keeper since the extendable latch is permanently connected to the mounting keeper. This is advantageous because these special devices, such as sensors and feelers, are subject to failure, damage, or human error in using them. A further related advantage of the elimination of these special devices is the corresponding elimination of extra cost and weight.

An additional feature of the present invention is that the slots, links, and spring prevent the extendable latch from becoming bound during opening and closing of the thrust reverser cowlings. This is advantageous because the thrust reverser cowlings must be opened and closed in a short period of time to perform required engine repair and/or maintenance. If problems were to occur in the opening and closing of the thrust reverser cowlings due to the latch mechanism, extra time would have to be spent to repair the latch mechanism instead of the aircraft, resulting in extra cost and delayed flight times for the aircraft.

Other features and advantages of the present invention will be set forth in part in the description which follows and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

BRIEF DESCRIPTION OF THE DRAWINGS

FIG. 6 is a top plan view of an extendable latch in the closed position.

FIG. 7 is a partial sectional view of an extendable latch taken along line 7—7 of FIG. 6 illustrating a sliding pin positioned within slots in the first and second walls of a housing.

FIG. 8 is a partial sectional view of an extendable latch taken along line 8—8 of FIG. 5 illustrating an extendable linkage rotatably mounted to the first and second walls of a housing.

FIG. 9 is a partial sectional view of an extendable latch taken along line 9—9 of FIG. 5 illustrating an extendable linkage rotatably mounted to a strut.

FIG. 10 is a partial sectional view of an extendable latch taken along line 10—10 of FIG. 6 illustrating a detent mechanism rotatably mounted to the first and second walls of a housing.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
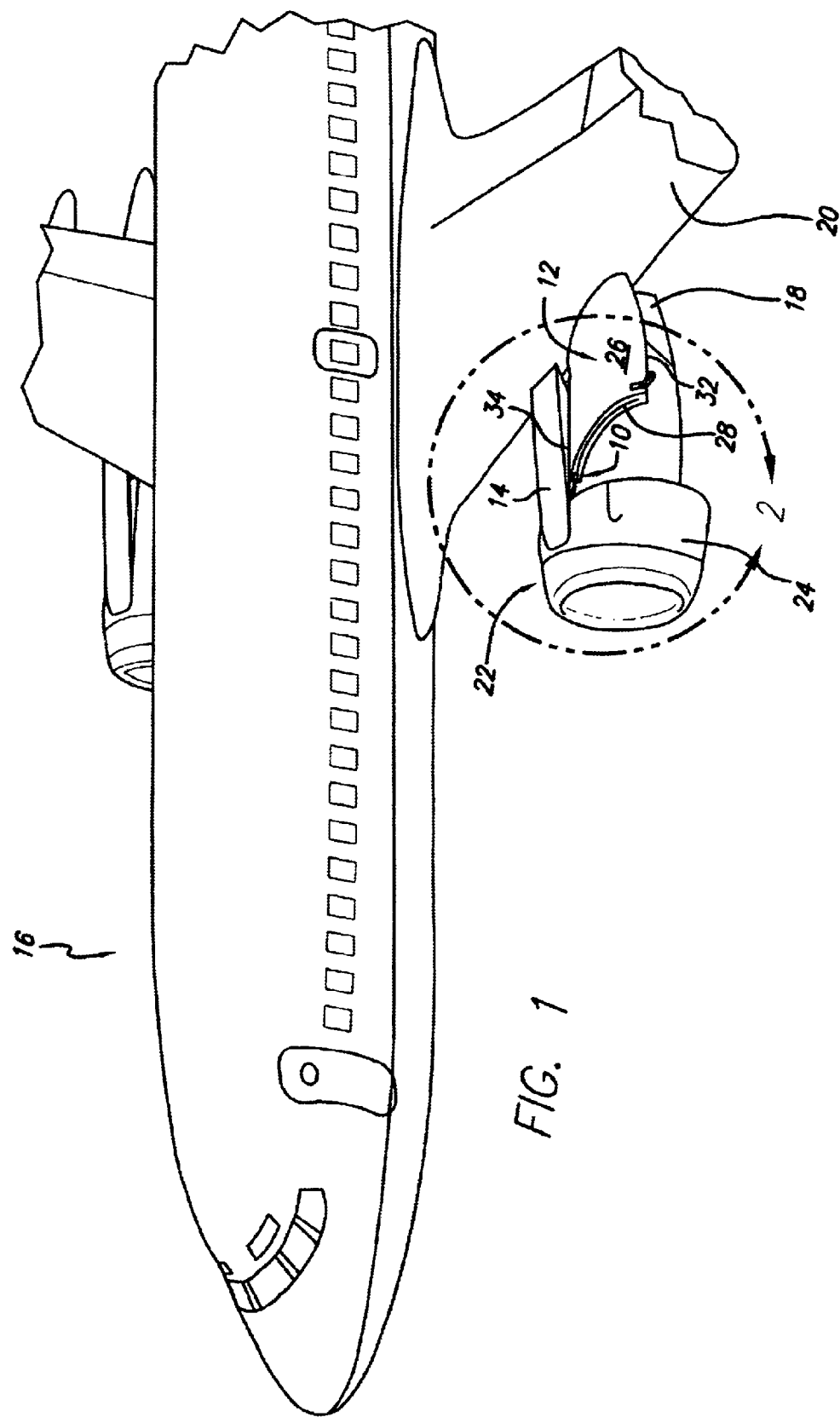
FIG. 1 is a partial perspective view of a jet aircraft having a thrust reverser cowling in the open position.

Although the present invention is subject to a wide range of applications, it is especially suited for use with aircraft, and will be particularly described in that connection. As shown in the exemplary drawings, with particular reference to FIG. 1, the present invention is embodied in an extendable latch 10 that secures a thrust reverser cowling 12 to an engine pylon 14. FIG. 1 shows a jet aircraft 16 having a jet engine 18 attached to an aircraft wing 20. The aircraft wing includes an engine pylon which supports the jet engine. A nacelle 22 is attached to the engine pylon. The nacelle circumscribes the jet engine and assists the engine pylon in supporting and positioning the jet engine relative to the aircraft wing. The nacelle includes a pair of fan cowlings 24 and a pair of hinged thrust reverser cowlings (one shown), one of the thrust reverser cowlings extending down from each side of the engine pylon. During aircraft operation, the pair of thrust reverser cowlings define the engine exhaust nozzle (not shown) and withstand the considerable hoop loads caused by the high pressure of the jet exhaust stream which flows through it.

Figure 2:
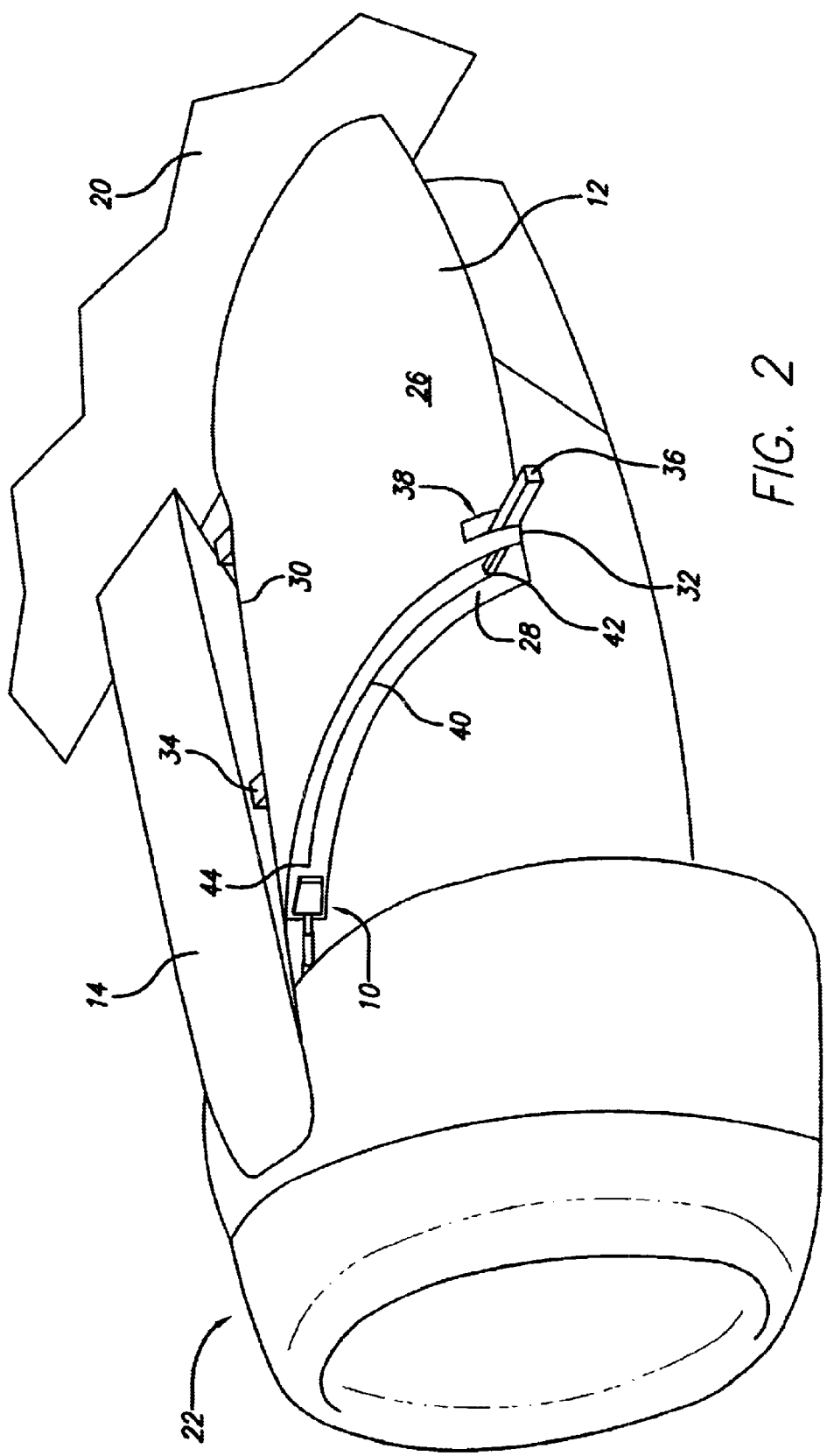
FIG. 2 is an enlarged perspective view of the portion of FIG. 1 enclosed in circle 2 showing an extendable latch connected between an engine pylon and a thrust reverser cowling.

Referring additionally to FIG. 2, each thrust reverser cowling 12 defines an outer wall 26, a front sidewall 28, a top edge 30, and a bottom edge 32. Each thrust reverser cowling is connected along its top edge to the engine pylon 14 by hinges 34. This permits each thrust reverser cowling to be pivoted upward and into its open position providing access to the jet engine 18 for maintenance and repair. During aircraft operation, the pair of thrust reverser cowlings are pivoted downward into their closed positions in which their bottom edges are adjacent to one another forming a bottom split line (not shown). The thrust reverser cowlings are held together at their bottom edges by tension latches (not shown) located at the bottom split line. The thrust reverser cowlings are also attached at their top edges, near the hinges, to the engine pylon by an extendable latch 10 according to the present invention.

Figure 5:
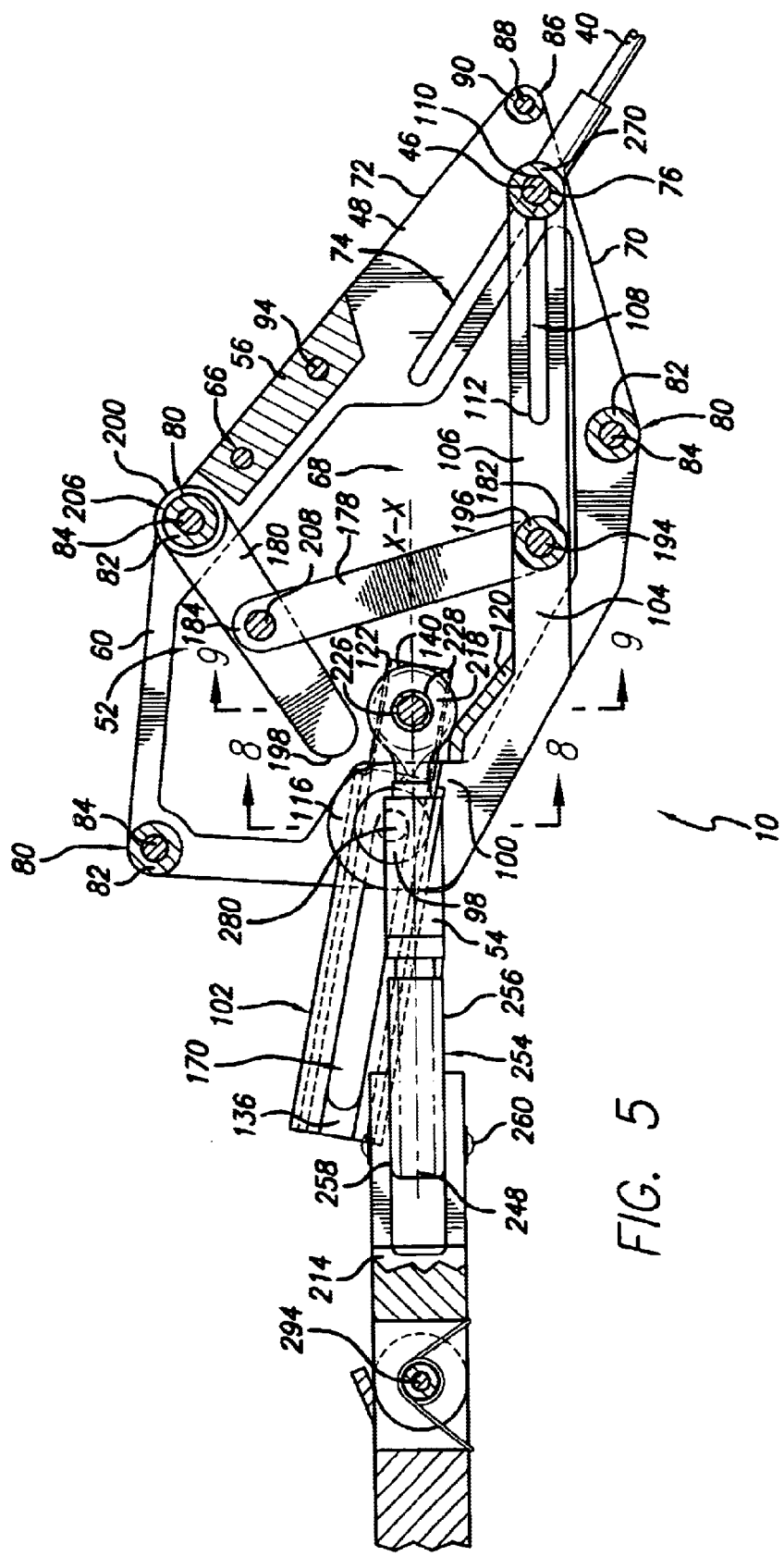
FIG. 5 is a sectional view of an extendable latch in the closed position.

A handle 36 is retained within a handle slot 38 in the thrust reverser cowling 12. The handle slot is located adjacent to where the bottom edge 32 and the front sidewall 28 meet. A push/pull cable 40, having a cable first end 42 and a cable second end 44, connects to the handle at the cable first end. As best seen in FIGS. 2 and 5, the push/pull cable extends from the cable first end along the front sidewall to the cable second end, which connects with a sliding pin 46 that is part of the extendable latch 10. The push/pull cable permits the transfer of a load generated by the actuation of the handle to the extendable latch allowing the handle to move the extendable latch between open and closed positions.

Figure 3:
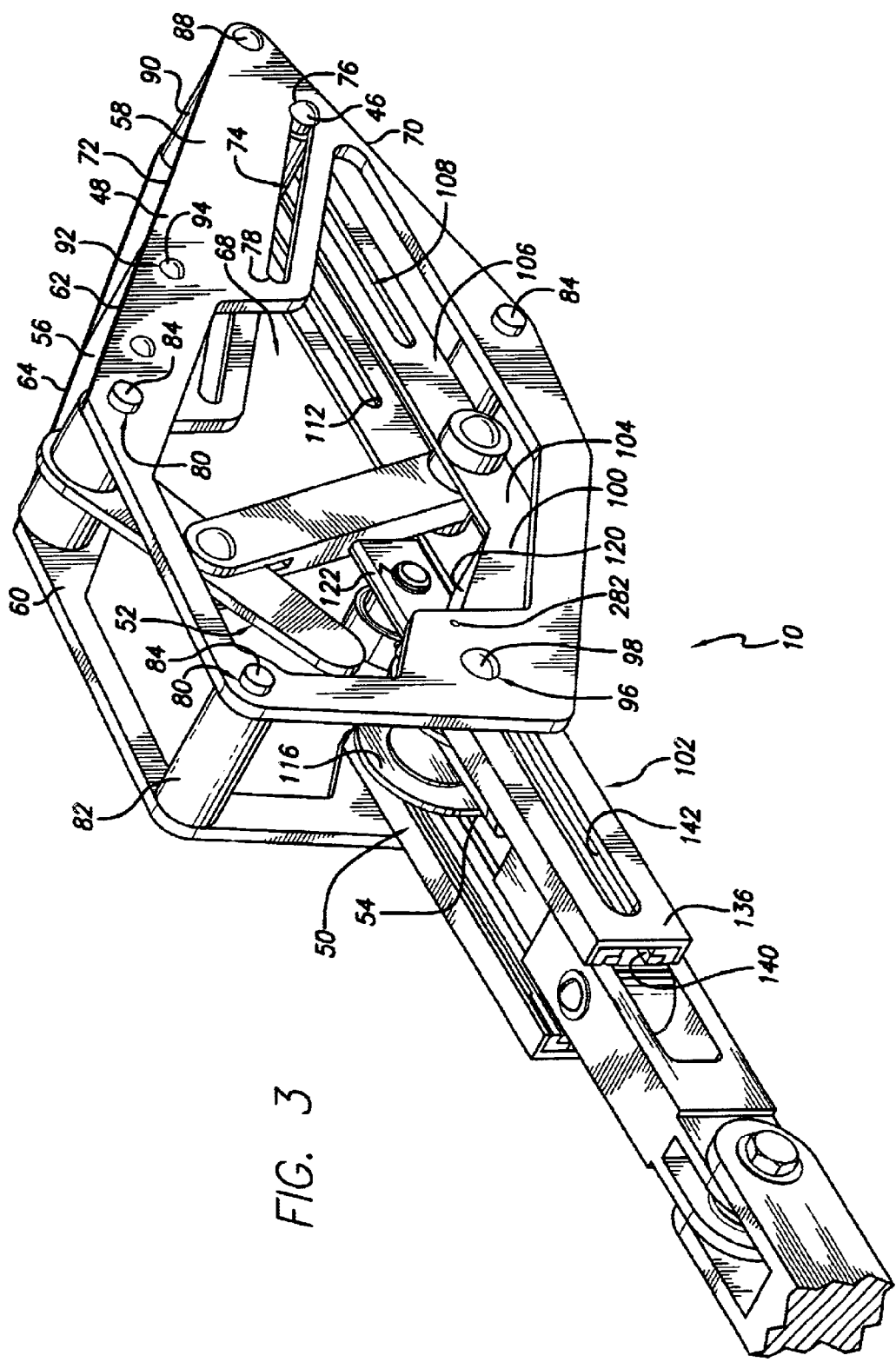
FIG. 3 is an enlarged perspective view of an extendable latch in the closed position.
Figure 4:
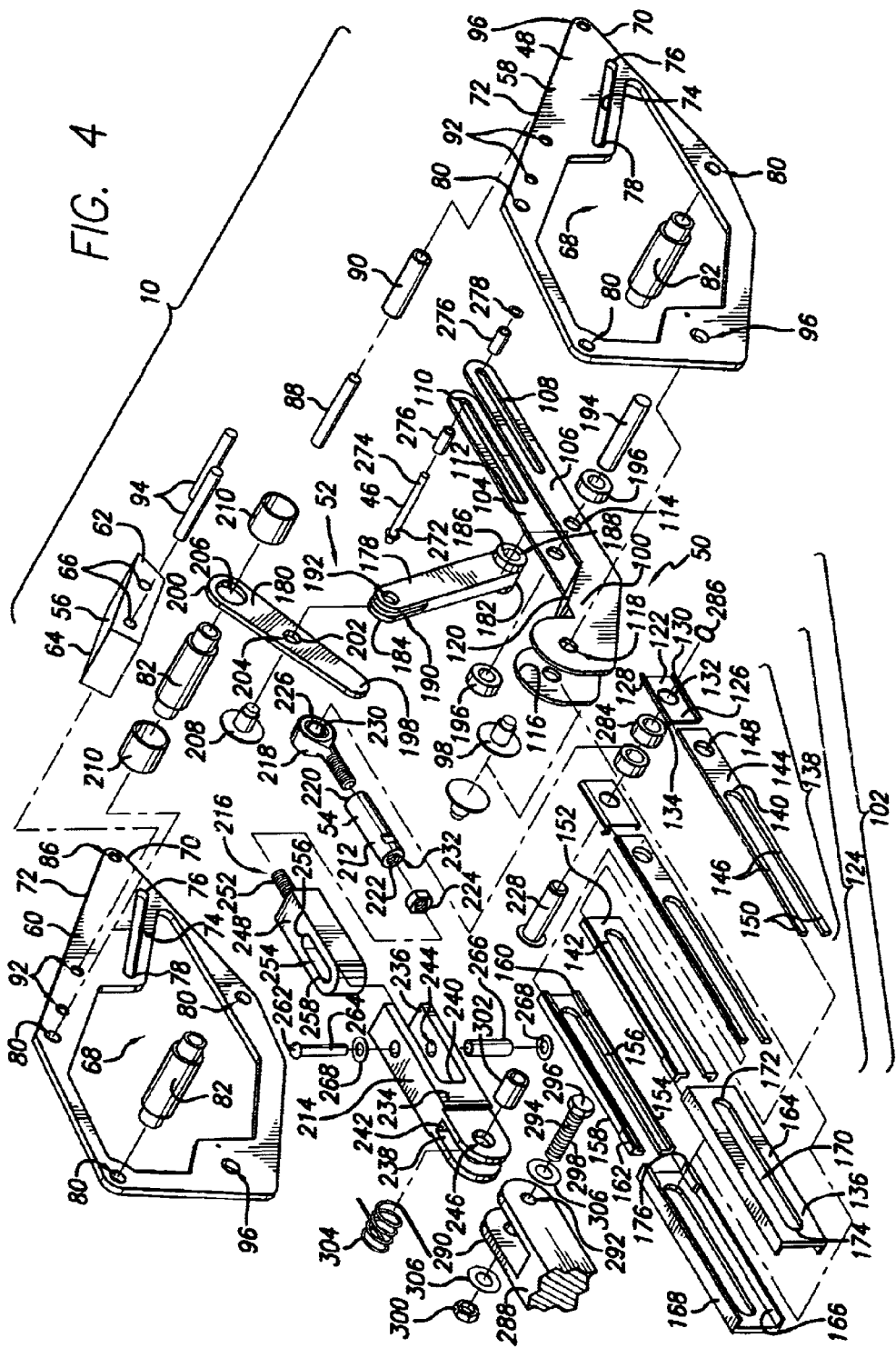
FIG. 4 is an exploded view of an extendable latch.

Referring to FIGS. 3, 4, and 5, the extendable latch 10 includes a housing 48, an extendable linkage 50, a detent mechanism 52, and a strut 54. The housing is comprised of a base 56, a first wall 58, and a second wall 60. The base includes a first side 62 and a second side 64 which are mounted to the first and second walls, respectively. The first and second walls are aligned with, spaced apart, and held parallel to one another by the base. The base also includes two base bores 66.

The first and second walls 58, 60 are planar and each includes an aperture 68, a rear-bottom edge 70, a back edge 72, and a slot 74, having a slot first end 76 and a slot second end 78. Each slot is substantially parallel to the back edge and extends diagonally from its slot first end, adjacent the rear-bottom edge, to its slot second end. The slots in the first and second walls are aligned to receive the sliding pin 46.

In addition, the first and second walls 58, 60 each have three latch mounting holes 80 that allow the housing 48 to be mounted to the thrust reverser cowling 12. Step bushings 82 extend between the first and second walls of the housing and increase the overall strength of the housing by providing extra support to the first and second walls. A housing fastener 84 extends through each of the aligned pairs of latch mounting holes, through a step bushing, and into the thrust reverser cowling. The housing fastener and step bushings are used to securely align the first and second walls parallel to one another.

The first and second walls 58, 60 each have an end hole 86 which accepts and retains an end fastener 88. The end fastener extends between and connects the first and second walls providing extra support for the housing 48. An end bushing 90 surrounds the end fastener between the first and second walls. Also, the first and second walls each have two wall holes 92 that align with the two base bores 66. The aligned wall holes and base bores accept base fasteners 94 which mount the first and second walls to the base 56. Also, the first and second walls have aligned front holes 96, each for receiving a step rivet 98.

As seen in FIG. 4, the extendable linkage 50 includes a release lever 100 and a pair of over-center extendable link assemblies 102. The release lever includes a pair of release links 104. Each release link comprises a straight portion 106, including a link slot 108, having a link slot first end 110 and a link slot second end 112. The straight portion of each release link also has a link hole 114. Each release link also includes a curved portion 116 having an interface hole 118. A plate 120 connects to the two release links between the first straight portions and curved portions, respectively, and holds the release links parallel to one another.

Each extendable link assembly 102 has a bracket 122 and a plurality of adjacent links 124. The bracket has a rectangular-shaped bracket base 126, an upper bracket flange 128, and a lower bracket flange 130. The upper and lower bracket flanges are spaced apart and held parallel to one another by the bracket base. Each bracket base also defines a base hole 132. A stop 134 extends perpendicularly from each upper bracket flange.

The plurality of adjacent links 124 includes a base link 136 and a plurality of other links 138 made up of a first link 140 and a second link 142. When the extendable latch 10 is in the closed position, the first link is contained within the second link, and both the first link and the second link are contained within the base link for each extendable link assembly 102, respectively. Each first link is U-shaped and has an elongated first link top portion 144 and two first link depending legs 146. The first link top portion defines a first link hole 148. The end of each first link depending leg, furthest away from the first link hole, includes a first link stepped protrusion 150.

Each second link 142 includes a U-shaped base portion 152 and a pair of second link flanges 154. The second link flanges, which have second link interior surfaces 156 and second link exterior surfaces 158, are spaced apart and held parallel to one another by the base portion. A top-end stepped protrusion 160 extends from the second link interior surface at the end of each second link flange furthest away from the base portion. Also, a bottom-end stepped protrusion 162 extends from the exterior surface of each second link flange furthest away from the base portion.

Each base link 136 has a rectangularly-shaped base link base 164, a base link interior surface 166, and a pair of base link flanges 168. The base link base includes a centrally-disposed base link slot 170 having a base link slot first end 172 and a base link slot second end 174. Also, each base link flange includes a base link stepped protrusion 176 which extends from the base link interior surface of each base link flange.

Referring also to FIG. 5, it can be seen that the detent mechanism 52 includes a connecting link 178 and a blocking link 180. The connecting link includes a connecting link first end 182 and an opposing connecting link second end 184. The connecting link first end has transversely-extending flanged portions 186 which define a connecting link bore 188. The connecting link second end has an axially-extending connecting link slot 190 and aligned transversely-extending connecting link holes 192. The connecting link is rotatably mounted at the connecting link first end to the release links 104. A release link rivet 194, extends through the aligned link holes 114 of the release links and through the connecting link bore rotatably mounting the connecting link between the release links. A pair of release link bushings 196 surrounds the respective shaft of the release link rivet and are positioned adjacent the release links and away from the connecting link bore.

The blocking link 180 includes a blocking link first end 198 and an opposing blocking link second end 200. A blocking link middle section 202 is located between the blocking link first end and the blocking link second end. The blocking link has a blocking link hole 204 located in the blocking link middle section and an end hole 206 located at the blocking link second end. The blocking link fits within the connecting link slot 190 such that the blocking link hole aligns with the connecting link holes 192. A detent step rivet 208 extends through the aligned connecting link holes and through the blocking link hole, rotatably mounting the blocking link to the connecting link 178. Referring additionally to FIG. 10, the blocking link is rotatably mounted to the housing 48 by a housing fastener 84 which extend through the end hole of the blocking link, the pair of aligned latch mounting holes 80 in the first and second walls 58, 60, and blocking link spacers 210 surrounding the step bushing 82 on each side of the blocking link, respectively.

Referring to FIGS. 4 and 6, the strut 54 includes an arm 212 at one end of the strut, a receptacle 214 at the opposing end of the strut, and a clevis assembly 216. The arm includes a collar 218, an arm first end 220, an arm second end 222, and a nut-shaped configuration 224. The collar threadably mounts to the arm first end and defines an opening 226 for receiving a pin 228. The collar also includes a bearing 230 which rotatably mounts the pin to the strut. At the arm second end, the arm has a threaded bore 232 for receiving the clevis assembly. The nut-shaped configuration is positioned adjacent the arm second end.

The receptacle 214 includes a receptacle base 234, a first pair of extensions 236, and a second pair of extensions 238. The receptacle base has a base first end 240 and a base second end 242. The first pair of extensions are spaced apart and held parallel to one another by the base first end. Also, each of the first pair of extensions have aligned first extension holes 244. The second pair of extensions are spaced apart and held parallel to one another by the base second end. The second pair of extensions include aligned second extension holes 246.

The clevis assembly 216 includes a clevis 248, a clevis base 250, and a threaded clevis bolt 252. The clevis includes a clevis slot 254 having a clevis slot first end 256 and a clevis slot second end 258. The clevis base is adjacent the clevis slot first end. The clevis bolt extends from the side of the clevis base opposite the clevis slot first end.

The clevis bolt 252 is threadably mounted through the nut-shaped configuration 224 and into the threaded bore 232 of the arm second end 222. The receptacle 214 accepts the clevis 248 between the first pair of extensions 236. A keeper pin 260 is inserted through the aligned first extension holes 244 of the receptacle and through the clevis slot 254. The keeper pin secures the clevis to the receptacle. The keeper pin is comprised of a rivet 262 having a rivet shaft 264, a rivet bushing 266, and two rivet washers 268. The rivet bushing surrounds the rivet shaft and the two rivet washers are positioned around the rivet shaft adjacent both ends of the rivet.

The extendable latch 10 is connected between a thrust reverser cowling 12 and an engine pylon 14. Referring to FIGS. 4, 5, 6, and 7, the cable second end 44 of the push/pull cable 40 connects to the extendable latch via the sliding pin 46. The second end of the push/pull cable includes a rod-end bearing 270 which connects the push/pull cable to the sliding pin. The sliding pin extends through the aligned slots 74 of the first and second walls 58, 60 of the housing 48 and through the aligned link slots 108 of the release links 104. The sliding pin is a step pin 272 having a step pin shaft 274. A pair of step pin spacers 276 surrounds the step pin shaft between the rod-end bearing and the first and second walls of the housing, respectively. Also, a step pin washer 278 is interposed between the rod-end spacers and the first and second walls.

Referring to FIGS. 4 and 8, the extendable link assemblies 102 are positioned parallel to one another. The extendable link assemblies are rotatably mounted to the first and second walls 58, 60 of the housing 48 by step rivets 98 each having a step rivet center region 280. The step rivets extend through the interface holes 118 in the release links 104, through the aligned base link slots 170, and through the aligned front holes 96 of the first and second walls, respectively, connecting the release links and the extendable link assemblies to the first and second walls, respectively.

Referring to FIGS. 3 and 6, the first and second walls 58, 60 each have a ball plunger (not shown) mounted at a ball plunger position 282. The ball plungers constrain the horizontal movement of the extendable link assemblies 102. Each ball plunger comprises atypical ball and spring device and screws into the first and second walls, respectively, at the ball plunger position.

Referring to FIGS. 4 and 9, the extendable link assemblies 102 are rotatably mounted to the strut 54 by a pin 228. The pin extends through the aligned first link holes 148 of the first link top portions 144, through the aligned base holes 132 of the brackets 122, through a pair of pin spacers 284, and through the opening 226 in the strut. The pin is secured to the extendable link assemblies and the strut by a retaining ring 286.

Referring to FIGS. 2, 4, and 6, an elongated keeper bar 288, having a set of spaced apart parallel keeper bar extensions 290, is mounted to the engine pylon 14. Each of the keeper bar extensions has an aligned latch mounting hole 292. The receptacle 214 is rotatably mounted to the elongated keeper bar by a mounting keeper 294. The mounting keeper includes a mounting bolt 296, having a bolt shaft 298, a mounting nut 300, a mounting spacer 302, a spring 304, and mounting keeper washers 306. The mounting bolt, with the mounting spacer surrounding the bolt shaft, extends through the aligned latch mounting holes of the keeper bar and the aligned second extension holes 246 of the receptacle. The spring surrounds the spacer and the bolt shaft between the second pair of extensions 238 and contacts both the keeper bar and the receptacle. The spring applies force against the elongated keeper bar and the base second end 242 of the receptacle biasing the receptacle toward a level position or an above-level position relative to the elongated keeper bar and insuring proper closure of the extendable latch 10.

The method of use and operation of the extendable latch 10, constructed as described above, proceeds as follows. It should be appreciated that FIGS. 5 and 11a–11g, illustrating the operation of the extendable latch, are sectional views, and therefore, the description of the operation as to the illustrated sectional view applies to the other corresponding half of the extendable latch.

Referring to FIGS. 2 and 5, the extendable latch 10 is in a closed position such that the sliding pin 46 abuts the slot first end 76 of the second wall 60 of the housing 48, the sliding pin abuts the link slot first end 110 of the release link 104, and the keeper pin 260 abuts the clevis slot second end 258. It should be appreciated that, in the closed position, the strut 54 and the extendable linkage 50 have an over-center position relative to the center region 280 of the step rivet 98. In the over-center position, the collar is located between the first wall 58 and the second wall 60, and the central axis X—X of the strut is located below the center region of the step rivets. The over-center position prevents the strut from inadvertently rotating out of the closed position until the handle 36 is actuated.

In the closed position, the collar 218 of the strut 54 is located adjacent to the plate 120 of the release lever 100. The plate functions as a stop that prevents the strut from rotating downwards. In addition, the blocking link 180 of the detent mechanism 52 is in the blocking position where the blocking link first end 198 is adjacent the collar, securing the extendable linkage 50 and the strut in the closed and over-center position, and preventing the strut from inadvertently rotating upward.

Figure 11A:
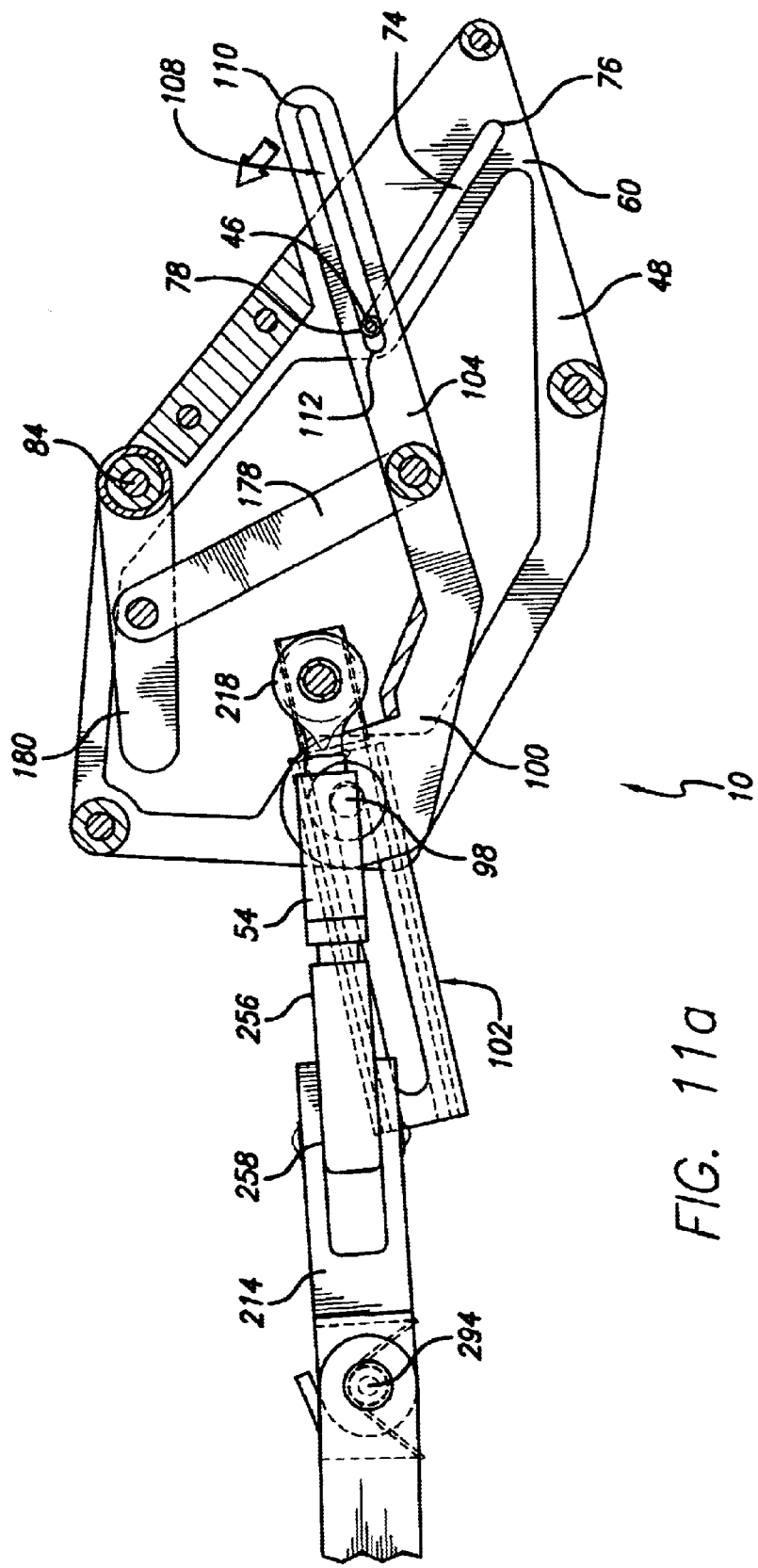
FIG. 11a is a sectional view of an extendable latch illustrating a shaft no longer in an over-center and locked position.

With reference to FIGS. 2 and 11a, to open the extendable latch 10, the handle 36 is pulled which in turn pushes the push/pull cable 40. The push/pull cable pushes the sliding pin 46 upwardly along the slot 74 of the second wall 60 to the slot second end 78. As the sliding pin moves along the slot, the sliding pin also moves along the link slot 108 of the release link 104 from the link slot first end 110 to a location adjacent to the link slot second end 112. The movement of the sliding pin forces the release lever 100 and the extendable link assembly 102 to rotate counter-clockwise about the step rivet 98 which in turn forces the collar 218 of the strut 54 to rotate in a counter-clockwise direction. Also, the receptacle 214 rotates counter-clockwise about the mounting keeper 294. As the strut moves out of the over-center position, the load of the thrust reverser cowling 12 transfers to the extendable link assembly, through the step rivet to the housing 48, and further to the hinge 34 to permit the opening of the thrust reverser cowling.

The counter-clockwise rotation of the release lever 100 about the step rivet 98 forces the connecting link 178 upward. The upward movement of the connecting link forces the blocking link 180 to rotate clockwise about a housing fastener 84 and a step bushing 82, and away from the collar 218 of the strut 54, into an unblocking position. In the unblocking position, the blocking link is no longer adjacent the collar and the collar is free to rotate so that the extendable latch 10 and the thrust reverser cowling 12 may now be opened.

Figure 11B:
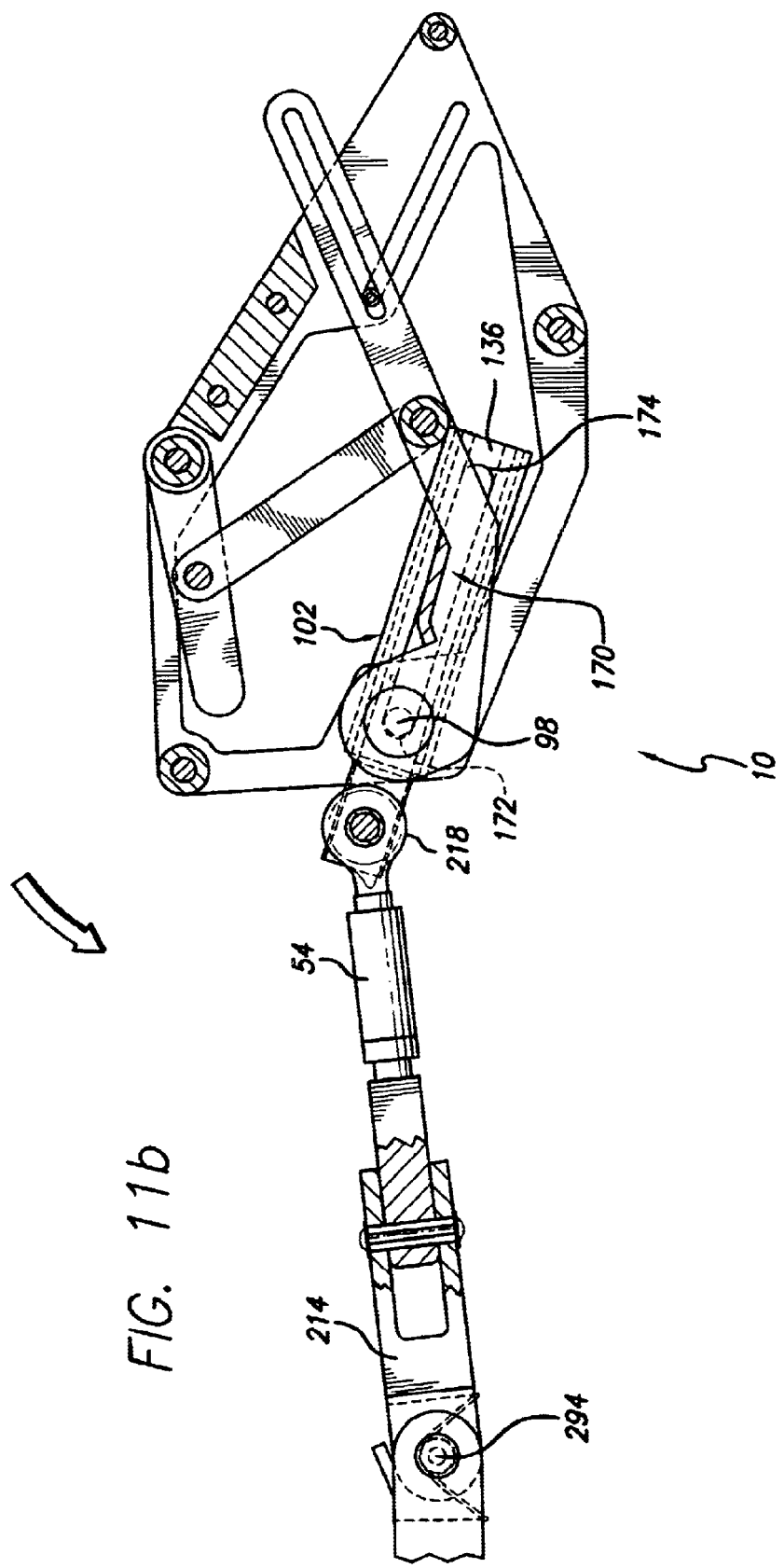
FIG. 11b is a sectional view of an extendable latch illustrating the rotation of an extendable linkage about a step rivet.

Referring to FIGS. 2, 11a, and 11b, as the thrust reverser cowling 12 is opened, the thrust reverser cowling pivots upward about the hinge 34. As the cowling pivots upward, the extendable link assembly 102 and the collar 218 of the strut 54 rotate counter-clockwise about the step rivet 98. During this rotation, the collar and extendable link assembly rotate from one side of the step rivet (see FIG. 11a) to the other (FIG. 11b). Also, the receptacle 214 rotates counter-clockwise about the mounting keeper 294.

Figure 11C:
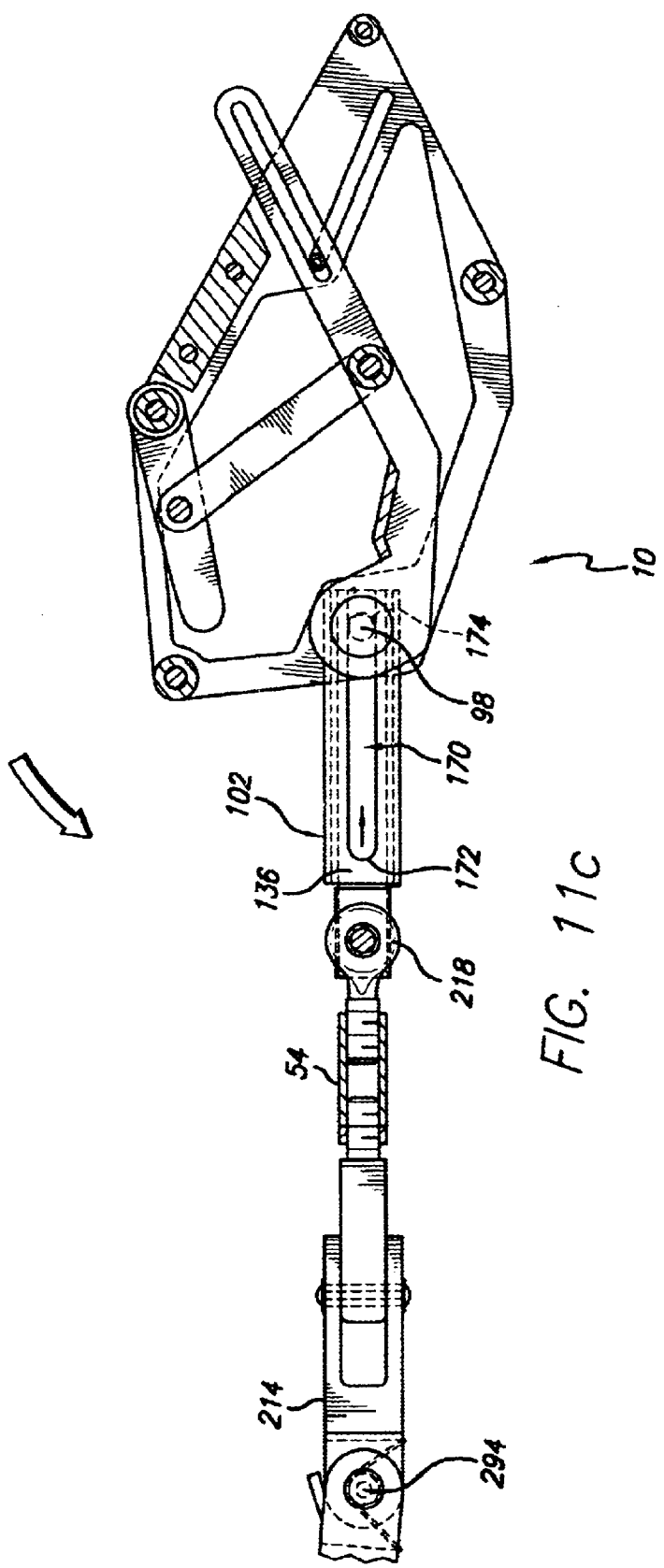
FIG. 11c is a sectional view of an extendable latch illustrating the movement of an extendable linkage along a step rivet.

With reference to FIGS. 2, 11b, and 11c, as the thrust reverser cowling 12 continues to pivot upward about the hinge 34, the extendable link assembly 102 and the collar 218 continue to rotate counter-clockwise relative to the step rivet 98. The base link 136 of the extendable link assembly rides on the step rivet and moves from an initial position where the step rivet abuts against the base link slot first end 172 (see FIG. 11b) to a position where the step rivet abuts against the base link slot second end 174 (see FIG. 11c).

Figure 11D:
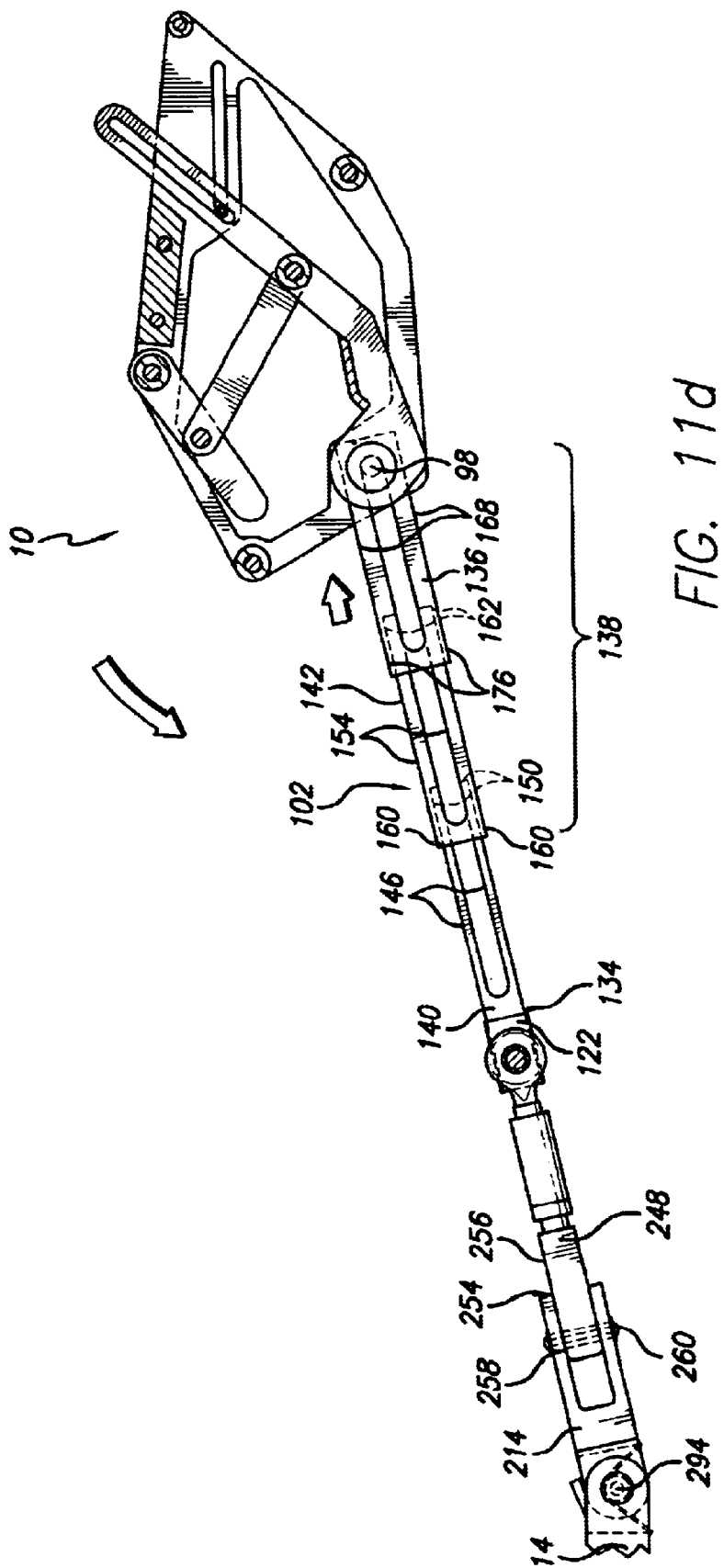
FIG. 11d is a sectional view of an extendable latch illustrating a fully elongated extendable linkage.

Referring to FIGS. 2, 11c, and 11d, as the thrust reverser cowling 12 continues to pivot upward, the extendable link assembly 102 elongates such that the base link 136 and the plurality of other links 138 telescope in and out of one another. As the extendable latch 10 is moved into the open position, each first link 140 telescopes in and out of each second link 142, respectively. Also, the first link depending legs 146 slide within the second link flanges 154. The first link stepped protrusions 150 of each first link depending leg are designed to contact the top-end stepped protrusions 160 of each second link such that each first link is prevented from sliding out of each second link, respectively. Therefore, the first link and top-end stepped protrusions permanently connect each first link to each second link, respectively.

Similarly, each second link 142 telescopes in and out of each base link 136, respectively. The second link flanges 154 slide within the base link flanges 168. The bottom-end stepped protrusions 162 of the second link flanges are designed to contact the base link stepped protrusions 176 such that each second link is prevented from sliding out of each base link, respectively. Therefore, the bottom-end and base link stepped protrusions permanently connect each second link to each base link, respectively. Furthermore, the stops 134 of each bracket 122 position each first link 140 within a second link, and the second link within a base link when the extendable latch 10 is in the closed position. FIG. 11d shows the thrust reverser cowling pivoted about the hinge to its fully open position.

Figure 11E:
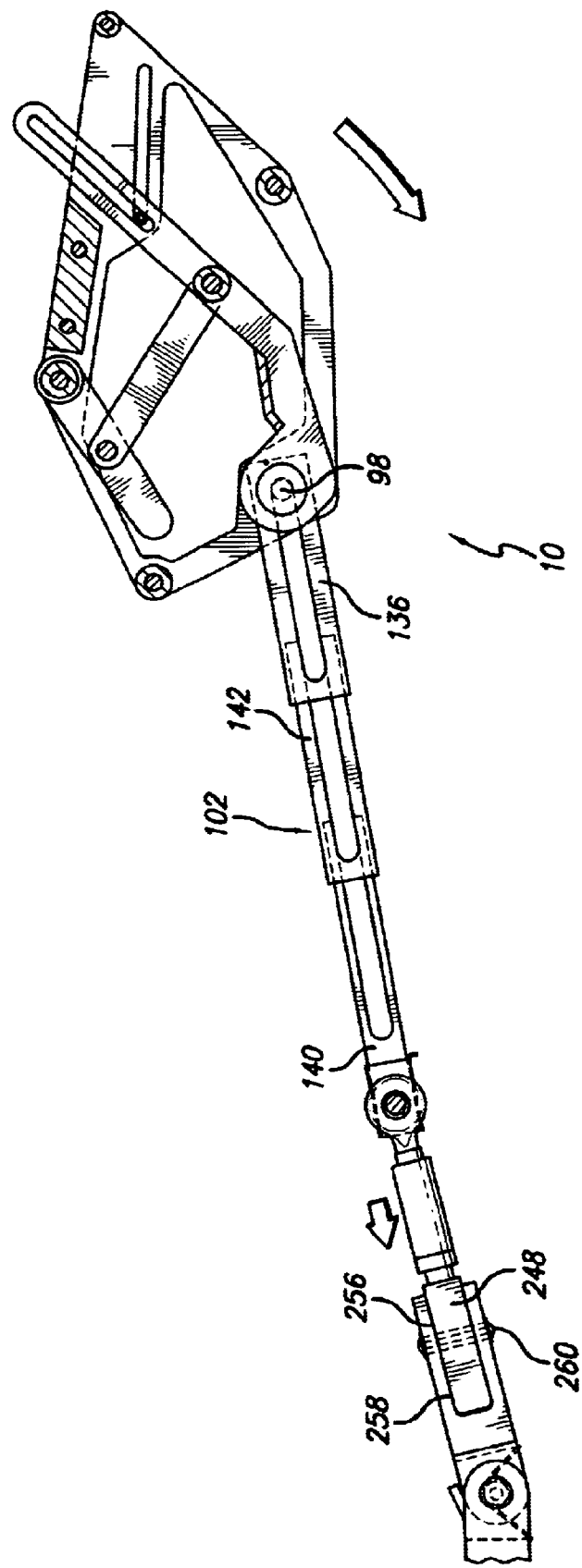
FIG. 11e is a sectional view of an extendable latch in an open position illustrating the movement of a strut along a keeper pin.
Figure 11F:
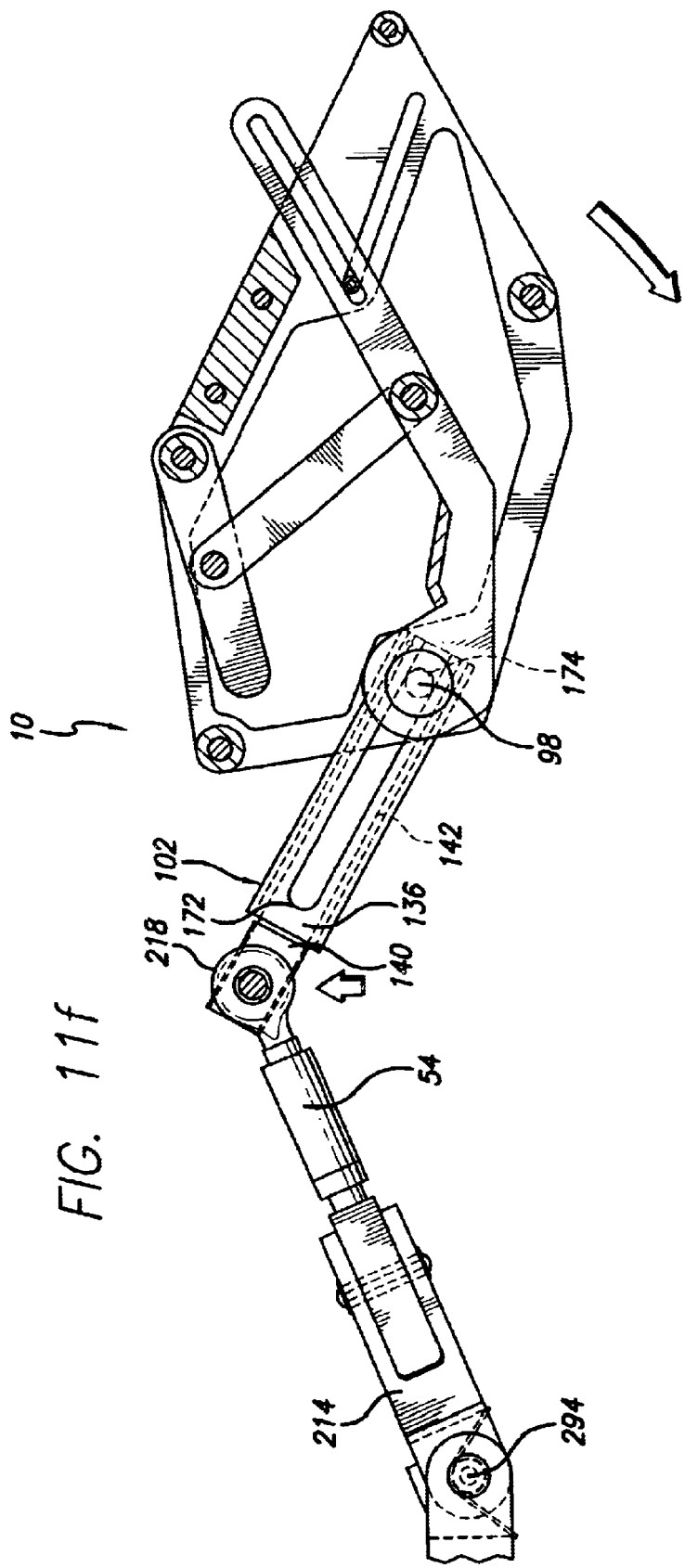
FIG. 11f is a sectional view of an extendable latch illustrating a fully contracted extendable link assembly.

Referring to FIGS. 2, 11e, and 11f, the subsequent process by which the extendable latch 10 closes with the thrust reverser cowling 12 is simply the reverse of the previously described process by which the thrust reverser cowling opens. As the thrust reverser cowling is closed, the clevis 248 slides such that the keeper pin 260 moves from an initial position where the keeper pin abuts against the clevis slot second end 258 to a position where the keeper pin abuts against the clevis slot first end 256. Next, the first link 140 telescopes back into the second link 142, and the second link with the first link contained therein telescopes back into the base link 136.

Figure 11G:
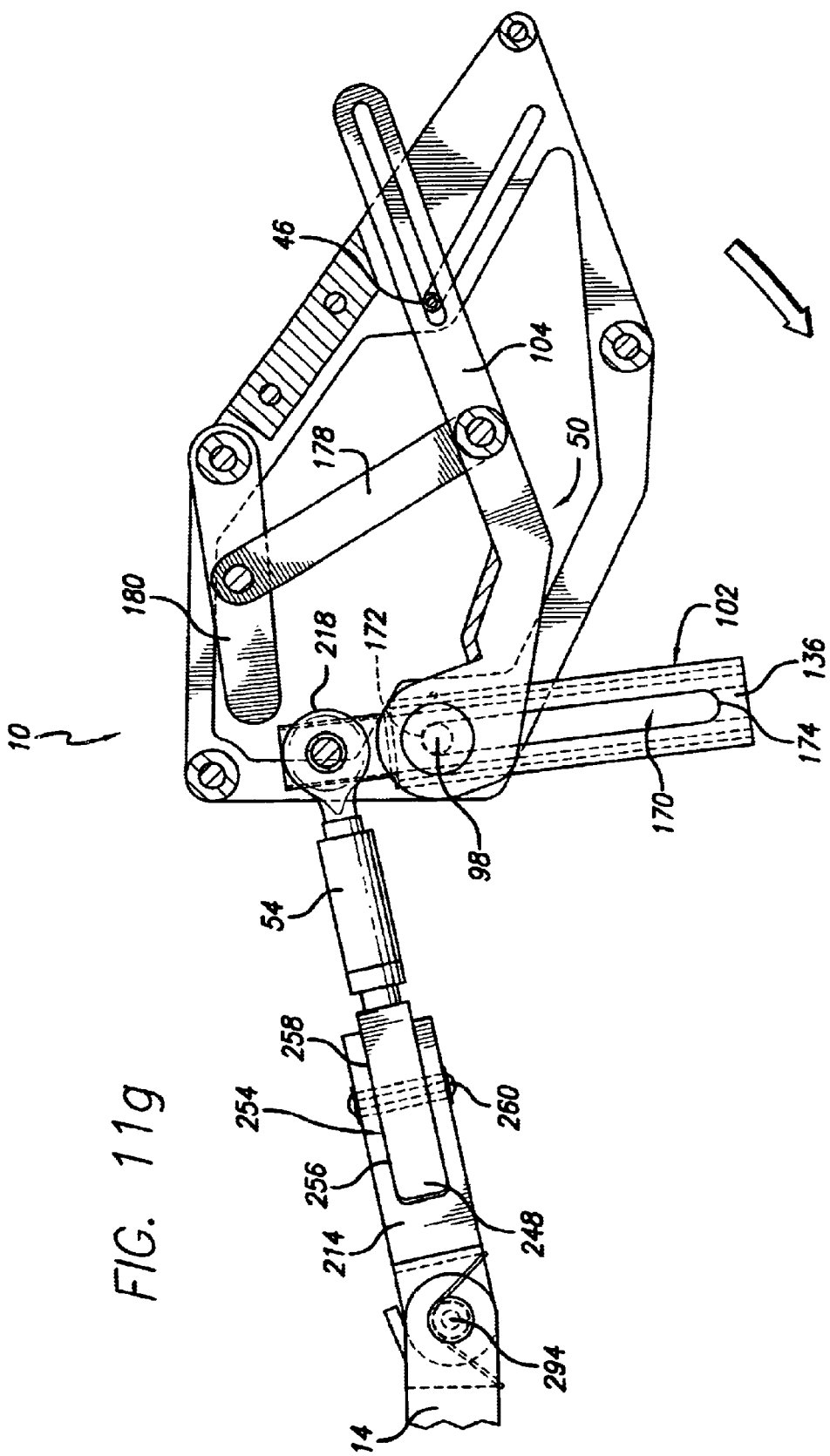
FIG. 11g is a sectional view of an extendable latch being closed illustrating the rotation of an extendable link assembly about a step rivet and the movement of a strut toward its over center position.

Referring to FIGS. 2, 11f, and 11g, the collar 218 of the strut 54 and the extendable link assembly 102 move relative to the step rivet 98. Specifically, the base link 136 of the extendable link assembly rides on the step rivet and moves from an initial position where the step rivet abuts against the base link slot second end 174 (see FIG. 11f) to a position where the step rivet abuts against the base link slot first end 172 (see FIG. 11g). Simultaneously, the collar and the extendable link assembly rotate clockwise about the step rivet back to their initial positions prior to the opening of the thrust reverser cowling 12 such that the strut and extendable link assembly resume the closed and over-center position. Also, the receptacle 214 rotates clockwise about the mounting keeper 294.

Referring to FIGS. 2, 5, and 11g, after the thrust reverser cowling 12 has been closed, the extendable latch 10 can then be closed by simply pushing the handle 36 which causes the push/pull cable 40 to pull the sliding pin 46 back to the slot first end 76 of the slot 74 in the second wall 60 and to the link slot first end 110 of the release link 104. As the extendable latch is closed, the blocking link 180 rotates with the release link from the unblocking position (see FIG. 11g) to the blocking position. Advantageously, the blocking link ensures that the extendable latch resumes the closed and over-center position. Therefore, when an operator properly closes the extendable latch, the operator can be assured that the strut 54 and extendable linkage 50 have resumed the closed and over-center position and that the thrust reverser cowling is rigidly latched by the extendable latch to the engine pylon 14.

As shown in FIGS. 4, 11d and 11e, the extendable latch allows for limited lateral movement of the clevis 248 relative to the receptacle 214. The lateral movement of the clevis is limited by the rivet bushing 266 contacting either the clevis slot first or second ends 256 and 258. Lateral movement of clevis relative to the receptacle advantageously allows for thermal expansion of the thrust reverser cowling 12 relative to the engine pylon 14 due to heat from the jet engine 18. Furthermore, referring to FIGS. 4 and 6, the interface of the rivet bushing and the clevis slot 254 allows for rotation of the clevis relative to the receptacle about the rivet bushing. The rotation of the clevis relative to the receptacle advantageously allows the extendable latch 10 to open when the strut 54 is not aligned with the receptacle, and thus, accommodates misalignment between the extendable linkage 50 and the keeper bar 288.

As previously described, the extendable latch 10 of the present invention includes an extendable linkage 50 that elongates and contracts permitting the extendable latch to open and close with the thrust reverser cowling 12, respectively. Advantageously, the extendable linkage elongates and contracts to accommodate different distances. Thus, allowing the extendable latch to be used on a variety of different models of aircraft, each of which have different distance requirements to permit the thrust reverser cowling to pivot between open and closed positions. The lengths of the links 140, 142, 136 that make up the extendable linkage may be chosen such that the extendable latch satisfies the distance requirements of a particular thrust reverser cowling. Therefore, by using the extendable latch, the need to specifically design a different top-mounted remote latch for each model of aircraft is eliminated. Also, by simply adjusting the number or the length of the links used in the extendable linkage, the extendable latch can be used with even a greater variety of aircraft.

A further advantage of the extendable latch 10 is that the strut 54 is permanently connected to the engine pylon 14 by the mounting keeper 294. This ensures that when the extendable latch is remotely closed, the keeper pin 260 is always properly engaged. A further related advantage of the extendable latch is that the need for special devices to alert a mechanic if the extendable latch is not properly engaged to the mounting keeper is eliminated because the extendable latch is permanently connected to the mounting keeper. Furthermore, the relationship between the clevis slot 254, the slots 74 in the first and second walls 58, 60, the link slots 108 in the extendable linkage assemblies 102, and the spring 304 prevent the extendable latch from becoming bound during opening and closing.

Those skilled in the art will recognize that other modifications and variations can be made in the extendable latch 10 of the present invention and in the construction and operation of the extendable latch without departing from the scope or spirit of this invention. For example, it should be understood that this device could also be used to remotely open and close a permanently connected latch over a wide range of distances for the mounting of a variety of different panels to various types of structures. With such possibilities in mind, the invention is defined with reference to the following claims.

We claim:

1. An extendable latch for use with an aircraft cowl comprising:

a housing having a first wall and a second wall, the first wall aligned with and positioned parallel to the second wall;

an extendable linkage rotatably mounted to the housing;

a keeper bar;

a strut, having a central axis and opposing ends, one end of the strut rotatably mounted to the extendable linkage, the other end of the strut rotatably mounted to the keeper bar;

a detent mechanism rotatably mounted to both the housing and the extendable linkage, the detent mechanism having an over center blocking position in which the detent mechanism is adjacent to the strut to maintain an attached cowl in a closed load position and an unblocking position in which the detent mechanism is away from the strut;

the detent mechanism includes
  a blocking link, having opposing ends, one end of the blocking link rotatably mounted to the housing, the other end of the blocking link adjacent to the strut when the detent mechanism is in the blocking position; and
  a connecting link, having opposing ends, one end of the connecting link rotatably mounted to the extendable linkage the other end of the connecting link rotatably mounted to the blocking link.

2. The extendable latch of claim 1, further comprising at least one step rivet rotatably mounting the extendable linkage to the housing, the step rivet having a center region.

3. The extendable latch of claim 2, wherein the end of the strut rotatably mounted to the extendable linkage includes a collar.

4. The extendable latch of claim 3, further comprising a pin inserted through the collar rotatably mounting the strut to the extendable linkage.

5. The extendable latch of claim 4, further comprising a mounting keeper rotatably mounting the strut to the keeper bar.

6. The extendable latch of claim 5, wherein the extendable linkage has an over-center position where the collar is located between the first wall and second wall and the central axis of the strut is located below the center region of the step rivet.

7. The extendable latch of claim 1, wherein the extendable linkage includes a plurality of adjacent links which telescope in and out of one another.

8. The extendable latch of claim 7, wherein each link of the plurality of adjacent links has at least one stepped protrusion, the stepped protrusion of each link mating with the stepped protrusion of an adjacent link such that each link is connected to an adjacent link.

9. The extendable latch of claim 2, wherein the extendable linkage includes a base link, having a base link slot, and a plurality of other links, and wherein the base link and the plurality of other links telescope in and out of one another the step rivet is mounted through the base link slot.

10. The extendable latch of claim 9, wherein the base link and each of the plurality of other links has at least one stepped protrusion, each stepped protrusion of each link mating with the stepped protrusion of each adjacent link such that each link is connected to its respective adjacent link.

11. An extendable latch comprising:
  a housing having a first wall and a second wall, the first wall aligned with and positioned parallel to the second wall;
  an extendable linkage;
  at least one step rivet, having a center region, rotatably mounting the extendable linkage to the housing;
  a keeper bar;
  a strut, having a central axis and opposing ends, a pin rotatably mounting one end of the strut, having a collar, to the extendable linkage, a mounting keeper rotatably mounting the other end of the strut to the keeper bar, the extendable linkage has an over-center position where the collar is located between the first wall and the second wall and the central axis of the strut is located below the center region of the step rivet; and
  a detent mechanism including;
    a blocking link, having opposing ends, one end of the blocking link rotatably mounted to the housing;
    a connecting link, having opposing ends, one end of the connecting link rotatably mounted to the extendable linkage, the other end of the connecting link rotatably mounted to the blocking link; and
    the detent mechanism having an over center blocking position in which the end of the blocking link not rotatably mounted to the extendable linkage is adjacent to the strut to maintain a closed load position, and an unblocking position in which the blocking link is away from the strut.

12. The extendable latch of claim 11, wherein the extendable linkage includes a plurality of adjacent links which telescope in and out of one another.

13. The extendable latch of claim 12, wherein each link of the plurality of adjacent links has at least one stepped protrusion, the stepped protrusion of each link mating with the stepped protrusion of an adjacent link such that each link is connected to an adjacent link.

14. The extendable latch of claim 11, wherein the extendable linkage includes a base link, having a base link slot, and a plurality of other links, and wherein the base link and the plurality of other links telescope in and out of one another the step rivet is mounted through the base link slot.

15. The extendable latch of claim 14, wherein the base link and each of the plurality of other links has at least one stepped protrusion, each stepped protrusion of each link mating with the stepped protrusion of each adjacent link such that each link is connected to its respective adjacent link.

16. An extendable latch comprising:
  a housing having a first wall and a second wall, the first wall aligned with and positioned parallel to the second wall;
  an extendable linkage including a base link, and a plurality of other links, the base link and the plurality of other links telescope in and out of one another, the base link includes a base link slot, at least one step rivet, having a center region, is mounted through the base link slot and rotatably mounts the extendable linkage to the housing, the base link and each of the plurality of other links has at least one stepped protrusion, the stepped protrusion of each link mates with the stepped protrusion of each adjacent link such that each link is connected to its respective adjacent link;
  a keeper bar;
  a strut, having a central axis and opposing ends, a pin rotatably mounting one end of the a strut, having a collar, to the extendable linkage, a mounting keeper rotatably mounting the other end of the strut to the keeper bar, the extendable linkage has an over-center position where the collar is located between the first wall and the second wall and the central axis of the strut is located below the center region of the step rivet; and
  a detent mechanism including;
    a blocking link, having opposing ends, one end of the blocking link rotatably mounted to the housing;
    a connecting link, having opposing ends, one end of the connecting link rotatably mounted to the extendable linkage, the other end of the connecting link rotatably mounted to the blocking link; and the detent mechanism having an over center blocking position in which the end of the blocking link not rotatably mounted to the extendable linkage is adjacent to the strut to maintain a closed load position, and an unblocking position in which the blocking link is away from the strut.

* * * * *